United States Patent [19]
Watts

[11] Patent Number: 5,516,158
[45] Date of Patent: May 14, 1996

[54] SELF-SWAGING THREADED TUBULAR CONNECTION

[76] Inventor: John D. Watts, P.O. Box 79466, Houston, Tex. 77279-9466

[21] Appl. No.: 855,850

[22] Filed: Mar. 20, 1992

Related U.S. Application Data

[63] Continuation-in-part of Ser. No. 705,328, May 24, 1991, Pat. No. 5,143,411, which is a continuation-in-part of Ser. No. 315,217, Feb. 24, 1989, Pat. No. 5,018,771, which is a continuation-in-part of Ser. No. 897,069, Jul. 18, 1986, Pat. No. 4,813,717 which is a continuation of PCT/US85/0260 Feb. 19, 1985, abandonded, which is a continuation of PCT/US84/1936 Nov. 23, 1984, abandoned.

[51] Int. Cl.$^6$ ..................... F16L 25/00
[52] U.S. Cl. ........... 285/333; 285/334.4; 285/382.2
[58] Field of Search ................ 285/333, 334, 285/334.4, 382.2

[56] References Cited

U.S. PATENT DOCUMENTS

| | | | |
|---|---|---|---|
| 597,000 | 1/1898 | Higbee | 285/333 |
| 929,027 | 7/1909 | Schuhmann | 285/333 |
| 2,051,499 | 8/1936 | Siegle | 285/333 |
| 2,056,112 | 9/1936 | Protin | 265/333 |
| 2,196,966 | 4/1940 | Hommer | 285/333 |
| 2,772,102 | 11/1956 | Webb | 285/334 |
| 3,109,672 | 11/1963 | Fronz | 285/334 |
| 4,508,375 | 4/1985 | Patterson et al. | 285/334 |

FOREIGN PATENT DOCUMENTS 641950  7/1962  Italy ..................... 285/333

*Primary Examiner*—Dave w. Arola

[57] ABSTRACT

An Integral Self-Swaging Threaded Tubular Connection to connect ends of plain-end pipe or the like without the use of a coupling is disclosed that may be selectively tightened to various positions of make-up to effect strength efficiencies up to 100% with respect to the pipe body. Tapered pin threads (62) are formed on tubular member (60) for sealing cooperation with box threads (63) formed on tubular member (61), the threads being dimensioned such that when they are screwed together power tight, the box is swaged outwardly to a first predetermined configuration as at (90) and the pin is swaged inwardly to a second predetermined configuration as at (91) such that pin wall (92) at the last engaged pin thread and box wall (93) at the last engaged box thread are substantially the same thickness as the nominal pipe wall (94), to thereby effect a full-strength connection.

18 Claims, 3 Drawing Sheets

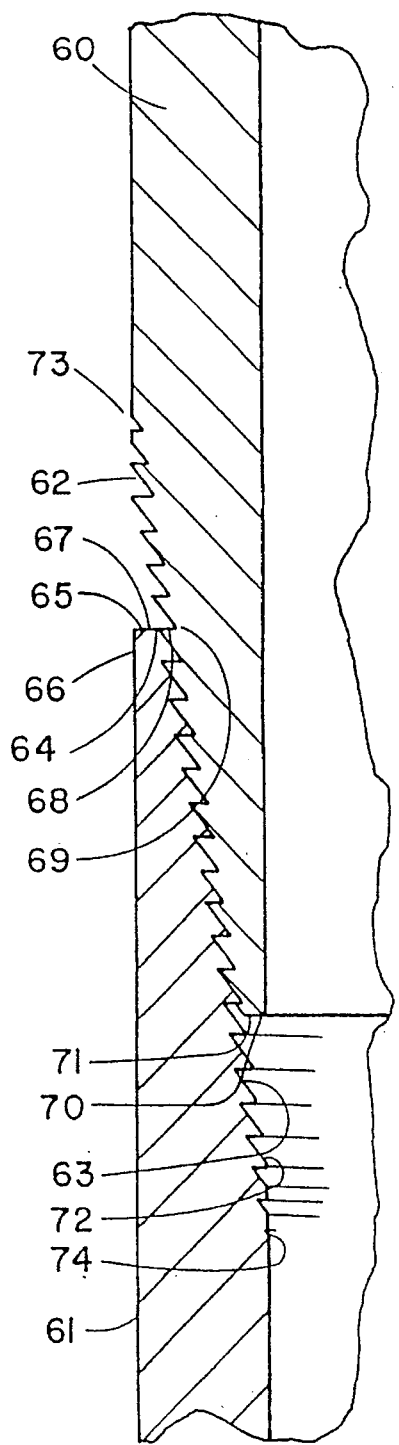
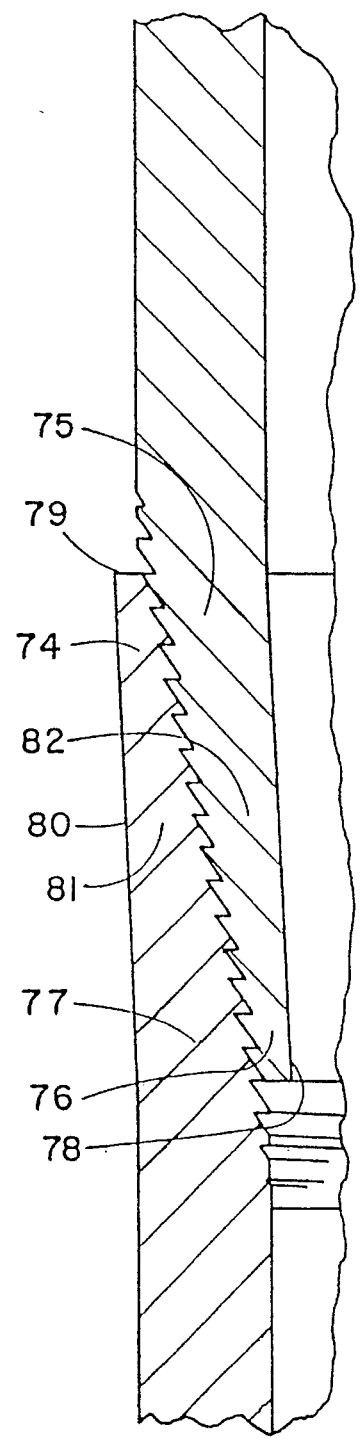
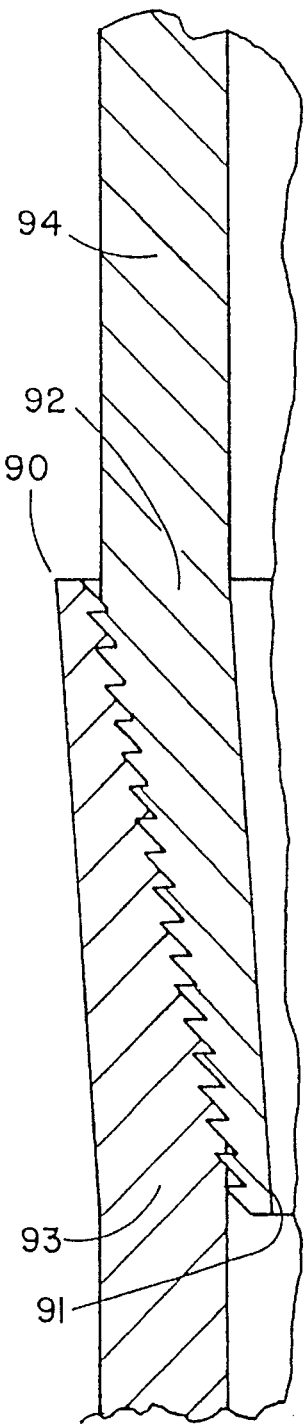

SELF-SWAGING THREADED TUBULAR CONNECTION

This application is a continuation-in-part of prior application Ser. No. 705,328 filed May 24, 1991 and which issued as U.S. Pat. No. 5,143,411 which was a C-I-P of application Ser. No. 315,271 filed Feb. 24, 1989 and which issued as U.S. Pat. No. 5,018,771 which is a continuation-in-part of application Ser. No. 897,069 filed Jul. 18, 1986 and issued as U.S. Pat. No. 4,813,717, which was a continuation of PCT/US85/0260 filed Feb. 19, 1985 now abandonded, which was a continuation of PCT/US84/1936 filed Nov. 23, 1984, now abandoned.

TECHNICAL FIELD

The outer diameters of conventional threaded pipe couplings are substantially greater than the outer diameter of the pipe joints that they connect and the same is true for most strings of casing and tubing installed within oilwells, however, several constraints are presented by oilwells that are not normally present in surface piping systems. Each consecutive string including couplings, must pass within a hole bore diameter established by a drill or by a previously set string of pipe. Additionally, there must be sufficient clearance between that bore and the maximum diameter of the string being run so as to lower freely without sticking and to allow sufficient flow area through the annulus then formed for fluids, without causing an unacceptable pressure drop caused by friction of the flowing fluid. Thirdly, oilwell strings must withstand axial tension and compression loads caused by the weight of miles of pipe that may be hanging within the well. Further, oilwell strings may be subject to external fluid pressures being greater than internal pressures to thereby introduce tendency to collapse. For these and other reasons, joints with upset ends and high cost "premium connections" have been introduced to work in the presence of such constraints. However, such solutions result with to the outer diameters of connections being greater than the outside diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints, such as Hydril FJ Premium tubing connections enjoy only 43% axial tension strength as compared to the unthreaded pipe wall, about the same as non-upset API tubing connections. Presently, due to diameter constraints, a typical oilwell pipe program may be: 5½ OD×2⅞ OD×1.6 OD. To be far more advantageous, a 2⅞ OD×1.6 OD×1.05 OD can often make an installation possible due to clearance or cost reasons that the typical program above could not, and in every case, a less expensive and a more efficient installation should result. Many tons of steel per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without the axial stress exceeding the circumferential stress. Reduction of the pipe wall thickness as by a thread formed on a joint of non-upset pipe, will therefore reduce still further, the magnitude of axial stress that may be dedicated to support the pipe weight. There is therefore a substantial need for a non-upset, integral tubular connection having a higher efficiency with no loss of the connections ability to seal against fluid pressure.

For assembly of conventional threaded connections, the external thread must be carefully aligned both axially and angularly, with the internal thread before stabbing so as to prevent cross-threading of the connection. It is then moved axially to contact the end thread of the pin with a thread of the box to thereby effect stab position. The length of the pin thread that then projects into the box if any, is known as stab depth. Then, while being careful to maintain said alignment, the pin is rotated into the box by hand to a "hand-tight" position after which, a wrench is used to tighten the pin to a position of full makeup. The Accuracy of stabbing often determines the effect of the connection. Connections that have been cross-threaded usually leak even after a proper makeup. Connections that are put into service in a cros-threaded condition will not only leak but will rupture at a small fraction of the rated load. It is therefore clear that a connection designed to prevent cros-threading is highly desirable to eliminate the danger and damage that can be caused by such leakage and rupture.

An upset pipe end is generally understood by the industry as being a pipe end that has been heated to a temperature above the lower critical temperature for the pipe metal and then formed under great pressure so as to gather axially, metal of the pipe wall and thereby increase substantially, the cross-section area of the pipe wall at that end of the pipe. After upsetting the end of a high strength pipe, API Specifications require that the entire joint of pipe be quenched and tempered, all of which can greatly increase the cost of a joint of pipe.

In an effort to improve the radial clearance and cost of a tubular connection and still retain significant strength, "near-flush" connections were introduced which comprise "swaged" pipe ends. Swaged pipe ends are formed at temperatures below the lower critical temperature, by moderate radial pressures that increase or decrease the mean pipe diameter of the swaged zone, but do not substantially change the cross section area thereof. The swaged end of a high strength pipe need only be stress relieved at a temperature below the lower critical temperature, which is far less costly than a quench and temper. A pipe end may be "swaged-in" to a smaller diameter to receive an external thread or it may be "swaged-out" to a larger diameter to receive an internal thread. Generally, the outermost diameter of swaged-out ends is less than an API Coupling O.D. but more than pipe body O.D.

A typical family Of swaged pipe connections having efficiencies of 65% may seem to be adequate to an engineer while designing a well, if calculations indicate that pipe weight and fluid pressure will generate loads on the connections of only 50% of pipe strength. However, many factors deep in the earth can cause unexpected rupture of a connection, endangering both people and the environment, when well designs are based on pipe stress. For example: 0.19% strain will yield the body of API J55 pipe; 0.28% will yield N80; 0.38% will yield P110. If a high efficiency connection allows the strain of the pipe body to continue, it will usually accept 5% or more strain before rupture. However, if the parting load of a casing connection is less than the load to yield the pipe body, then the connection will part before strain reaches the low limits given above. Strains over 1% are often imposed on the casing of wells that produce from or near, over-pressured and under compacted reservoirs, of which there are many. If a connection parting load exceeds slightly, the load that will yield the pipe body, then the casing string will accept strains several times greater than if connection parting load is slightly below the pipe body yield load. To safely meet strain criteria for well design, connection efficiency should exceed the value=100× (pipe yield strength/pipe ultimate strength). Accordingly, casing connection strengths should exceed by some reasonable margin, the following % efficiencies: 73% for J55; 80% for N80 and P110 API Pipe Grades.

BACKGROUND ART

A flush joint tubular connection has inner and outer diameters substantially the same as the tubing joints which the connection connects. A flush joint tubular connection made by the Hydril Company and covered by numerous patents comprise a first straight thread, a second straight thread of sufficient diameter to pass within the bore of the first thread and a tapered mating seat between the two joints of tubing which is a premium joint of high cost and according to published data, enjoys only 42% axial strength with regard to the pipe wall.

Standard A.P.I. non-upset tubing connections comprise couplings having outer diameters considerably larger than the pipe outer diameter but still only enjoy approximately 42% efficiency as above. A.P.I. does list a "turned down" collar outer diameter to increase clearance between strings, however, the "turned down" diameter still exceeds substantially, the pipe outer diameter.

No prior art discloses a flush joint tubular connection having tapered threads, that when properly assembled, effects optimum stresses within the small end of the external thread and within the large end of %he internal thread so as to provide a connection of maximum efficiency. Conventional pipe connections have threads with like tapers and result in a constant diametrical interference along the taper between the external and internal threads, thereby causing excessive stresses or requiring increased wall thickness at the end of the pipe. Excessive stresses reduce the joint strength and an increased wall thickness rules out a flush joint connection.

It is therefore clear that a flush joint connection having a high efficiency as provided by the instant invention is needed for use within oilwells and other pipe assemblies wherein radial clearance is limited.

Standard pipe threads as well as A.P.I. threaded connections have such a tendency to cross-thread that "stabbing guides" are often used at a considerable cost of time and expense. Such threads have an extremely shallow stab depth and a relatively large thread depth, both of which add to the cross-thread problem. Perfect alignment is difficult to attain under normal field conditions and often impossible to attain under difficult conditions. Premium connections such as disclosed by Stone in U.S. Pat. No. 1,932,427 require even closer alignment to stab because of the close fit of straight threads and the "pin-nose" seal 32, which is highly susceptible to damage. To applicants belief no prior art comprised the combination of a deep stab, thread height and thread diameter as required to provide a tapered threaded connection that will stab easily and quickly without the possibility of cross-threading. By way of an example, a 2⅜ EU 8rd A.P.I. tubing thread has a 2.473" pin end diameter and a 2.437" box bore at the first thread which allows no entry of the pin into the box at stab position. The counterbore of the box allows entry of the pin only 0.446" affording at best, axial alignment but no angular alignment so less than six degrees of angular misalignment will allow it to cross-thread.

About 1940, A.P.I. changed from 10V threads to 8rd and a substantial improvement resulted because less gauling occurred during makeup of the threads. It was then commonly assumed "that any thread finer than 8 threads per inch would gall and cross-thread" and that myth persists today. However, the improvement resulted almost entirely from the better thread form, eliminating the sharp edge V threads. The present invention with threads as fine as 20 per inch, run fast and smooth without cross-threading, and it has other features as well.

Conventional "near-flush" connections mentioned above, have two-step straight box threads formed within swaged-out ends and pin threads formed on swaged-in ends. Such swaged ends comprise a single tapered zone extending axially from the pipe body of original pipe diameters having a mean conical angle of taper of approximately two degrees. Typically, such swaged connections are rated by their suppliers as having from 50% to 75% efficiency depending on wall thickness, and with a variety of fluid pressure ratings. Such a swaged connection when compared to a 42% conventional flush joint connection, has improved strength, but at the expense of clearance.

To applicants best knowledge and belief, all such swaged connections now on the market are swaged to form only the degree of taper that approximates the lay of threads to be formed thereto. Typically, before a thread is machined in the tapered zone, a clean-up cut is made to assure there being enough metal to fully form the threads. Unfortunately, such a cut reduces the cross-section area of the tapered zone which limits connection efficiency. Additionally, production machining allows for only approximate axial positioning of the pipe in the machine prior to gripping the pipe in the chuck and such approximation can cause further thinning Of the tapered zone. Thirdly, if first measurement of a freshly cut thread indicates that a thread recut is required, then the swage must be cut off and the end reswaged before even a 75% thread could be cut at that end. Therefore, in addition to the basic disadvantages of a two-step thread having a pin-nose seal, it is now even more clear why suppliers of pipe threads that are formed on swaged ends cannot provide a family of pipe connections with efficiencies greater than 75%.

Applicants patent 4,813,717 which is in the line of priority for the present application, discloses a connection with selective efficiency between 75% and 100% for non-upset pipe using a coupling in one embodiment per claims 1–17 and an integral connection in another embodiment per claims 18–19. The present invention is complimentary to said patent and teaches configurations for connections having swaged ends. To applicants best knowledge and belief, no non-upset integral connection is currently available that will meet the strain design criteria above. For users who prefer integral non-upset pipe connections, there is clearly a need for one with an efficiency sufficient to meet the strain design criteria defined above.

DISCLOSURE OF THE INVENTION

The present invention provides a tubular connection for joints of plain end pipe or the like, having a first tubular member formed with tapered external threads and a second tubular member formed with tapered internal threads for sealing cooperation with the external threads.

So as to avoid the pullout tendency inherent in a non-upset threaded pipe connection formed with conventional 60 degree thread flank angles with respect to the tubular axis, a thread form is provided that has a load bearing flank angle of at least 75 degrees with respect to the tubular axis, the optimum angle depending on such factors as the pipe diameter, the wall thickness and the material strength.

As taught by my series of patents beginning with U.S. Pat. No. 2,766,829 which have enjoyed worldwide commercial success for over 30 years in the oilfield, the space industry and the nuclear industry, the taper of the external thread may be formed at a lesser angle than the taper of the internal thread so as to ensure a maximum primary sealing tendency at the smallest pressure area so as to mimize the axial load imposed on the connection due to internal fluid pressure. The present invention may utilize this feature in combination with other features. With this feature, initial thread engagement occurs on the external thread at the small diameter end only, simultaneously as a radially spaced relationship exists between the internal and external threads elsewhere. As the connection is tightened toward full makeup, thread contact increases progressively from the small diameter end toward the large diameter end of the threads. The threads may be dimensioned such that at full makeup, the threads at the large diameter end are in contact also.

The use of flank angles that reduce pullout tendency also allows the use of a lesser thread depth than would be practical with the use of conventional 60 degree flanks. In turn, the lesser thread depth allows for a higher connection efficiency because a smaller portion of the pipe wall is removed to form the thread and thereby, a higher connection efficiency is possible for a flush or near-flush connection.

Machines to swage pipe sizes over 10" are very expensive and fewer large connections are threaded per run, so the cost usually prevents serious consideration of swaging large pipe connections. Yet the need for swaged connections several feet in diameter exists for such uses as on drive pipe, for pipe lines etc. Also a less expensive swaged pipe connection than is now available is needed in smaller sizes for some uses.

For these and other reasons, the present invention discloses a self-swaging connection having tapered mating threads of desired dimensions that can be formed on plain end pipe where upon make-up, the internally threaded box expands and the externally threaded pin contracts within predetermined limits, so as to provide a swaged connection of high efficiency. Before assembly of the connection, the threads are dimensioned such that: the box wall is thinner than the pin wall by a predetermined amount at the large end of thread engagement; the box wall is thicker than the pin wall by by a predetermined amount at the small diameter end of thread engagement; the box and pin walls are substantially equal in strength in a plane intermediate the large diameter end and the small diameter end.

Thread dimensions are selected such that upon full make-up of the connection: toward the large thread diameter end, the box wall will expand to predetermined dimensions; toward the small thread diameter end, the pin wall will contract to predetermined dimensions; the box wall will expand about the same amount that the pin wall contracts at the plane of equal strength; to thereby effect sealing engagement of the threads along their full length of engagement.

By way of example, the outer box diameter may be swaged larger than the original pipe outer diameter by an amount equal to twice the radial thread depth so as to effect a connection efficiency of approximately 90%, or by an amount equal to four times the radial thread depth to effect 100% efficiency. Within reasonable design parimeters, the ratio of plastic to elastic deformation effected will decrease with: thread depth decrease; pipe diameter increase; pipe material yield strength increase. In a connection of 100% efficiency, the pin face bore will contract about the same amount that the box face O.D. expands.

After assembly, the threads will lie along a generally steeper taper than the taper they were machined on. The threads must be dimensioned before their assembly such that when the box and pin are assembled to the hand-tight position, there is a predetermined number of turns from the position of full make-up so the angle of taper can effect the desired amount of swaging of the box and pin as they are tightened to a position of full make-up. The threads may be machined with a single taper or on various taper combinations without departing from the spirit of the present invention.

Such desired dimensions may effect: face widths of the box and pin sufficient to prevent premature jumpout of the threads when under axial loads; sufficient length of thread engagement to ensure a fluid seal; a cross section wall area at the last engaged thread of the box and of the pin to allow a selective connection efficiency between 50 and 100%. For services that can accept an efficiency less than 100%, the resulting bore through the connection can be increased by tightening the connection a lesser number of turns past the hand-tight position than is necessary for a 100% connection.

Such swaging will usually be mostly plastic and partially elastic. However, for large diameter pipes with thin walls and high yield strengths, the swage could be fully elastic. Per inch of diameter, all connections may have an elastic return equal to: the yield strength of the material divided by its modulas of elasticity. The remainder of the swage if any, will be in the plastic range and the pipe will not return.

Some services require pipe connections having higher bending and/or compression strengths than normal service, such as for use with drive pipe and marine risers used on offshore wells. To provide such strengths, the thread form stab flank of the present invention may be increased as required and also, the taper angle of the thread cone may be reduced to increase the length of engaged threads within existing diameter constraints.

BRIEF DESCRIPTION OF THE DRAWINGS

FIG. 5 depicts a fragmentary section of a connection in accord with the present invention, when hand-tight.

FIG. 6 depicts the connection of FIG. 5, at a make-up position to effect a high efficiency connection.

FIG. 7 depicts the connection of FIG. 5, at a make-up position to effect a full strength connection.

DETAILED DESCRIPTION OF THE INVENTION

Figure 1:
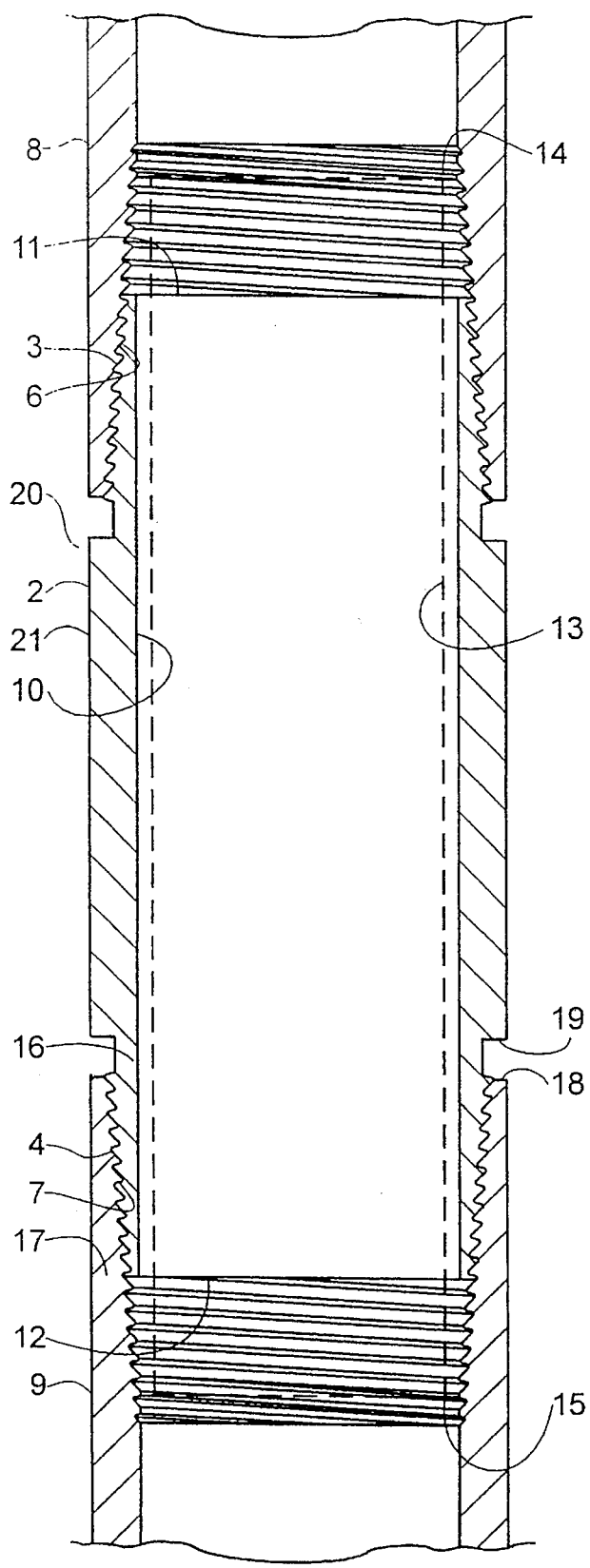
FIG. 1 depicts a vertical section of a connector in accord with the present invention.

FIG. 1 depicts tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of non-upset tubing 8 and 9 respectively, to be connected.

Coupling 2 may comprise inner diameter 10, upper end surface 11 and lower end surface 12, said end surfaces not extending for the full length of internal threads 6 and 7. Such a connection, as limited by the tension area resulting between the root diameter of the last engaged thread as at 12, and the tubing outer diameter, may provide an axial tension strength in excess of three fourths of the pipe wall strength, effecting an efficiency greater than 75%.

Should a connection of higher strength be required, coupling 2 may be formed with inner diameter as at 13, upper end surface as at 14 and lower end surface as at 15. The coupling thereby extending for substantially the full effective length of the internal threads so as to provide a connection having an axial strength substantially equal to the pipe wall strength to thereby approach 100% efficiency.

Figure 3:
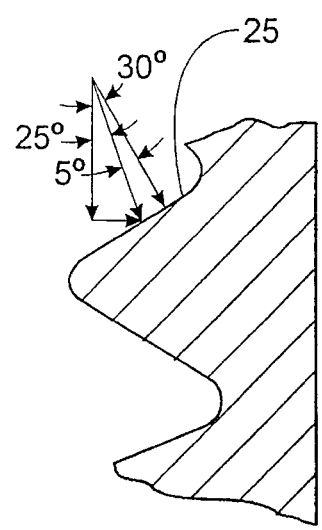
FIG. 3 illustrates a thread form in accord with conventional connections.
Figure 2:
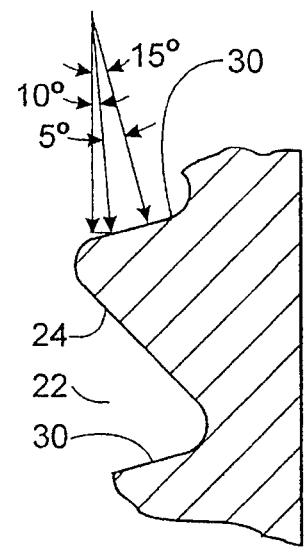
FIG. 2 illustrates a thread form in accord with the present invention.

Since typical tubing joints have lengths of sixty times or more the lengths of couplings that connect them, the couplings may be formed of material much stronger than the material the joints are formed of without causing significant increase of cost for the entire string. The use of higher strength material for the coupling 2 provides a higher axial strength for the connection 20 because, the strength of the coupling at neck section 16 is increased and because, collapse resistance of the pipe end as at 12 is increased to thereby increase the pullout strength also. To further increase the pullout strength of the connection, a thread form having a load bearing flank 30 formed at 75 degrees with respect to the tubing axes as depicted in FIG. 2, may be used for the mating threads as opposed to the most common thread form used on oilwell tubulars, depicted in FIG. 3. The form of FIG. 3 has a load bearing flank 25 which effects an angle of 60 degrees with the tubing axis. Assuming an angle of friction of 5 degrees, elementary vector analysis will show that the form depicted in FIG. 2 results in a pullout strength 2½ times that of FIG. 3. Reduction of the flank angle still further, can virtually elimimate tendency to pullout.

So as to ensure a seal diameter for the connection of least diameter and therefore the least axial fluid load, the taper of the external thread may be made slightly less than the taper of the internal thread. Such a condition also allows maximum radial compression of the coupling as at end surface 12 adjacent pipe wall as at 17 which may be formed thicker than the adjacent coupling wall. Thus, upon makeup, end 12 will compress more than wall 17 expands due to the difference in thickness, the moduli of elasticity being considered substantially the same. Since coupling 2 may be made of higher strength material than tubing joints 8 or 9, the thickness may be dimensioned such that stresses in walls at 12 and 17 are more nearly at the same percentage of the yield strength of the materials of which the members are formed.

When the taper of the external thread is made less than the taper of the internal thread, initial contact between the two occurs only at the small end as at 12 with the internal thread as at 17. Upon continued makeup, thread contact progresses toward the larger end of the tapers to cause full engagement of the threads as at 18. A slight amount of further makeup may cause a predetermined magnitude of circumferential stress within the end of the tubing joint as at 18 and thereby establish a position of full makeup, so as to cause: compressive circumferential stresses within end 12 to be at a first desired value, simultaneously with tension circumferential stresses within the tubing joint wall between 17 and 18 being at a second desired value, less in magnitude than said first value. Said values may be set at the same percentage of the unit yield strengths of the respective materials to thereby effect a maximum strength for the connection.

Connection 20 may comprise shoulder 18 formed on the end of joint 9 and shoulder 19 formed on coupling 2 intermediate thread 4 and the outer diameter 21 of coupling 2. The mating threads may be dimensioned so as to makeup as shown in FIG. 1 or should greater bending and compression strength or greater tortional strength be desired, the mating threads may be dimensioned and given closer tolerances so as to allow shoulders 18 and 19 to abut upon makeup.

Figure 4:
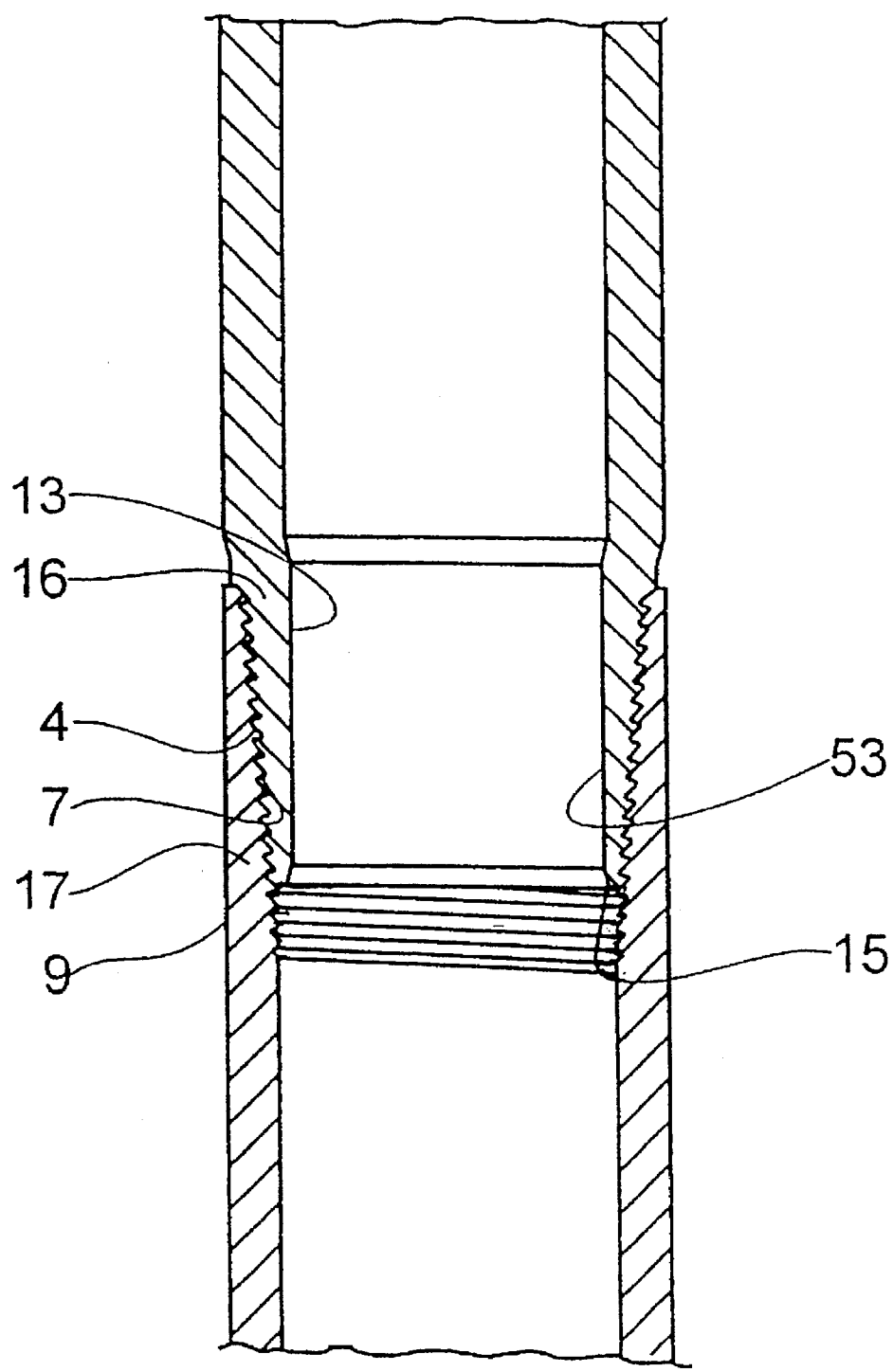
FIG. 4 depicts an embodiment of the present invention that provides shoulder abutment upon make-up.

FIG. 4 depicts a preferred bore configuration for the pin end which can include minimum bore diameter extending to the pin neck as at 13 and an outwardly tapering bore extending therefrom to the pin end as at 53 which is sufficiently larger than bore 13 so as not to restrict bore 13 upon contraction of bore 53 upon make-up of the connection. This preferred pin configuration may be formed on each end of a coupling and it may also be formed on the end of a pipe joint that has been swaged-down so as to provide for bore 13 being smaller than the nominal pipe bore.

FIG. 5 depicts a self-swaging tubular connection of the present invention in the hand-tight position, comprising pipe joint 60 formed with tapered pin thread 62 and pipe joint 61 having tapered box thread 63 formed for sealing cooperation with pin thread 62 as later described. Box thread root diameter 64 at box face 65 is preferably dimensioned such that the radial width 67 of face 65 is not less than radial thread depth 68 positioned between root diameter 64 and box thread crest diameter 69 to prevent premature "jumpout" of the threads under tensil loading. Likewise, it is preferred that radial width 70 of pin face 71 not be less than depth 68 for the same reason. Box thread taper 72 should be slow enough to provide a sufficient length of box thread 63 to prevent thread jumpout, in cooperation with the thread load flank angle depicted in FIG. 2.

If the root diameter of the pin thread extends substantially to the outer diameter of the pipe as at 73 as is well known in the manufacture of collar type connections, and if the root diameter of the box thread extends to the bore of the pipe as at 74 taught by my U.S. Pat. No. 4,813,717 in the line of priority for the present application, then a high strength self-swaging connection is now apparent.

For services where a full-strength connection is not required and a maximum bore is desired, the connection may be made-up as depicted in FIG. 6. Upon such make-up, box wall 74 toward the large diameter end of thread engagement at face 65, is thinner than adjacent pin wall 75 and therefore, box wall 74 is swaged outwardly by pin wall 75 to a predetermined outer box diameter 79. Likewise, pin wall 76 toward the small diameter end of thread engagement at face 71, is thinner than adjacent box wall 77 and pin wall 76 is swaged in by box wall 77 to bore dimension 78 predetermined by both the box and pin thread dimensions and the make-up position. At plane of equal strength 80, axially positioned intermediate faces 65 and 71, the outwardly swaging of box wall portion 81 is substantially equally to the inwardly swaging of pin wall 82. Because both the box and pin wall are stressed triaxially when under tension, it is an important feature of the present invention that the degree of swaging in both walls decreases as the axial load transfers from the mating thread. In further explanation, wall 74 has received a greater degree of swaging and therefore more tangential stress than wall 77 but does not carry as much axial stress. Conversely, wall 77 can carry a higher axial stress because it does not carry as much tangential stress.

For services where a full strength connection is required and a smaller bore is acceptable, the connection may be made up as depicted in FIG. 7 whereupon, box outer diameter 90 has been swaged larger than diameter 79 and bore 91 has been swaged smaller than bore 78. It is now apparent that pin wall 92 at the last engaged pin thread and box wall 93 at the last engaged box thread are substantially the same as the nominal pipe wall 94 to thereby effect a full-strength connection.

As taught by the above identified patent, the use of thread forms having minimum thread depths and high load flank angles, with respect to the tubular axis, facilitates the functions of clearance and efficiency for flush and near-flush connections. Such features may be used in combination with the present invention to add new features such as, reducing the degree of swaging required to attain a desired face width.

Upon review of these disclosures, it is now apparent that an integral, full strength swaged connection can be formed with plain end pipe without need for upsetting or swaging prior to threading of the pipe ends. The portion of the swage that is elastic equals the pipe diameter multiplied by the yield stress, divided by the modulas of elasticity. The rest of the swage is plastic. The present invention may be used for a wide range of services and it may be desirable to vary the amount of makeup to suit each service. One API standard allows for 3% cold work of tubular goods, with regard to cold swaging before threading, so that may be a practical limit of this connection for such API services. An example within such a limit is as follows: A 30 O.D. pipe with a 1" wall and a radial thread depth of 0.133" requires a full strength connection; 4×0.133=0.532"=the amount of swage required; 0.532/30=0.0177 which is 1.77%; since 1.77% is less than 3% then the connection would be acceptable.

Many tubular connections have only half as much strength under axial compression loads as they have under axial tension loads. A connection that is derated in compression will have approximately that same derating in bending. So as to adapt a connection in accord with the present invention to any desired compression rating up to 100%, the stab flank angle (24) depicted in FIG. 2 may be adjusted as required without departing from the spirit of the present invention.

The thread form depicted in FIG. 2 may be used with the present invention wherein angle 22 formed between load flank 30 and stab flank 24 is at least twice the angle of friction between the box and pin materials, so as to prevent lockup of the box and pin threads with each other due to the high interface pressures generated by the radial forces necessary to swage the connection during makeup.

I claim:

1. An integral pipe connection for connecting like joints of non-upset pipe together, each joint being formed at an end with tapered external pin threads and formed at the other end with tapered internal box threads for cooperation with the pin threads of another such joint, the threads having a predetermined radial depth, comprising: the pin and box threads being formed on pipe ends of original pipe diameter and dimensioned such that as they are screwed together from the hand tight position to the desired position of makeup, the pin will be plastically swaged inwardly to a first predetermined configuration such that pin threads nearest the pin face will be mounted on a pipe wall having a thickness not less than the radial depth so as to engage mating box threads near the pipe bore and the box will be plastically swaged outwardly to a second predetermined configuration such that box threads nearest the box face will be mounted on a pipe wall having a thickness not less than the radial depth so as to engage mating pin threads near the pin outermost diameter; such that the pipe connection strength will exceed 65% of, the pipe wall strength that existed before forming of the threads.

2. The connection of claim 1 further comprising: the second predetermined configuration of the box being of maximum diameter at the face of the box.

3. The connection of claim 2 further comprising: said maximum diameter being substantially equal to the sum of the original outer diameter of the pipe plus twice the radial depth of the thread.

4. The connection of claim 2 further comprising: said maximum diameter being substantially equal to the sum of the original outer diameter of the pipe plus four times the radial thread depth.

5. The connection of claim 1, further comprising: the pin thread being substantially the same length as the box thread.

6. The connection of claim 1, further comprising: the pin thread extending substantially to the outer diameter of the pipe.

7. The connection of claim 1, further comprising: the box thread extending substantially to the bore diameter of the pipe.

8. The connection of claim 1 further comprising: the predetermined configuration of the pin being of minimum diameter at the face of the pin.

9. The connection of claim 8 further comprising: said minimum diameter being smaller than the original bore of the pipe by an amount substantially equal to twice the radial thread depth.

10. The connection of claim 8 further comprising: said minimum diameter being smaller than the original bore of the pipe by an amount substantially equal to four times the radial thread depth.

11. The connection of claim 1 further comprising: the pin threads extending substantially to the outer diameter of the pipe; the box thread extending substantially to the pipe bore; the threads being dimensioned such that at full make up of the connection, the box and pin threads are engaged such that a connection is effected, that has a strength substantially equal to the pipe strength that existed before forming of the threads.

12. The connection of claim 1, further comprising: the box and pin being made up to a selected position intermediate the hand tight position and the position of full makeup so as to effect a desired connection strength intermediate 50% and 100% of the pipe strength that existed before forming of the threads and thereby effect a larger bore diameter and a smaller maximum box outermost diameter, than would exist if the connection were tightened to the position of full makeup.

13. The connection of claim 1 further comprising: the pin thread being formed on a smaller taper angle than the box thread is formed on.

14. The connection of claim 1 having a thread form further comprising: a load flank formed on an angle of at least 75 degrees with respect to the tubular axis.

15. The connection of claim 14 further comprising: the thread form having a stab flank formed on an angle smaller than the angle that the load flank is formed on, with respect to the tubular axis.

16. The pipe connection of claim 1 further comprising: the stab flank angle, the cone angle of the thread and the thread diameters being dimensioned so as to provide an assembled axial compressive strength of the engaged threads that exceeds 65%, relative to the pipe body strength that existed before forming of the threads.

17. The connection of claim 16 wherein the axial compressive strength of the engaged threads exceeds 80%, relative to the pipe body strength that existed before forming of the threads.

18. The connection of claim 1, further comprising: the threads being formed for sealing engagement; the threads being assembled with the use of pipe dope to lubricate and seal between the threads.

* * * * *